United States Patent
Ruelas

(10) Patent No.: US 8,135,387 B2
(45) Date of Patent: Mar. 13, 2012

(54) DYNAMIC HANDLING OF URGENT CALLS IN MOBILE COMMUNICATION DEVICES

(75) Inventor: Gabriel Ruelas, Jalisco (MX)

(73) Assignee: International Business Machines Corporation, Armonk, NY (US)

(*) Notice: Subject to any disclaimer, the term of this patent is extended or adjusted under 35 U.S.C. 154(b) by 531 days.

(21) Appl. No.: 12/348,950

(22) Filed: Jan. 6, 2009

(65) Prior Publication Data
US 2010/0173614 A1    Jul. 8, 2010

(51) Int. Cl.
*H04M 1/725* (2006.01)
(52) U.S. Cl. .......... 455/412.1; 455/412.2; 455/413; 455/566; 455/567
(58) Field of Classification Search ........ 455/412.2, 455/412.1, 413, 566, 567; 379/207.11, 67.1
See application file for complete search history.

(56) References Cited

U.S. PATENT DOCUMENTS

| 6,175,616 B1 | 1/2001 | Light et al. |
| 2001/0043680 A1 | 11/2001 | Scheel |
| 2004/0002329 A1 | 1/2004 | Bhatia et al. |
| 2005/0286701 A1* | 12/2005 | Suvanne et al. ......... 379/207.11 |
| 2006/0259565 A1 | 11/2006 | Cheung et al. |
| 2007/0041518 A1* | 2/2007 | Silver et al. ............ 379/67.1 |
| 2009/0147937 A1* | 6/2009 | Sullhan et al. .......... 379/201.02 |

* cited by examiner

*Primary Examiner* — David Q Nguyen
(74) *Attorney, Agent, or Firm* — Cantor Colburn LLP; Ayla Lari

(57) ABSTRACT

A method for selectively permitting the completion of communications to a user's mobile communication device placed in silent mode includes: receiving an incoming communication from a caller; obtaining availability information for the called party and a first code; sending a message to the caller with the called party's availability and the first code; receiving a call from the caller with a second code; and allowing communication with the caller in the event the second code matches the first code.

19 Claims, 3 Drawing Sheets

DYNAMIC HANDLING OF URGENT CALLS IN MOBILE COMMUNICATION DEVICES

BACKGROUND

This invention relates generally to communication via wireless electronic devices, and more particularly to a method and system for dynamically providing availability information of a called individual to a caller, and selectively permitting the completion of urgent communications to the called individual's wireless communication device.

Mobile communication devices, such as cellular phones, have become a central communication tool for both business and personal use. Competitive pressures and multiple billing options have lowered the subscriber cost of operation of mobile communication devices. In many instances, the mobile or cellular phone has replaced the traditional landline phone as a person's primary communication device. Advanced mobile communication devices (cell phones, personal digital assistants (PDA), portable computing devices, etc.) offer not only voice services, but also text messaging and Internet access. Video and gaming applications are also now available on many mobile devices and service networks.

BRIEF SUMMARY

Embodiments of the present invention include a method, article, and system for selectively permitting the completion of communications to a user's mobile communication device placed in silent mode includes: the method includes: receiving an incoming communication from a caller; obtaining availability information for the called party and a first code; sending a message to the caller with the called party's availability and the first code; receiving a call from the caller with a second code; and allowing communication with the caller in the event the second code matches the first code.

An article comprising one or more computer-readable storage media containing computer readable instructions that, when executed by a computer enables a method for selectively permitting the completion of communications to a user's mobile communication device placed in silent mode, the method includes: receiving an incoming communication from a caller; obtaining availability information for the called party and a first code; sending a message to the caller with the called party's availability and the first code; receiving a call from the caller with a second code; and allowing communication with the caller in the event the second code matches the first code.

A system for mobile communications, the system includes: one or more computing and communication devices in communication through a network; wherein the one or more computing and communication devices are configured to: receive an incoming communication from a caller; obtain availability information for the called party and a first code; send a message to the caller with the called party's availability and the first code; receive a call from the caller with a second code; and allow communication with the caller in the event the second code matches the first code.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1A:
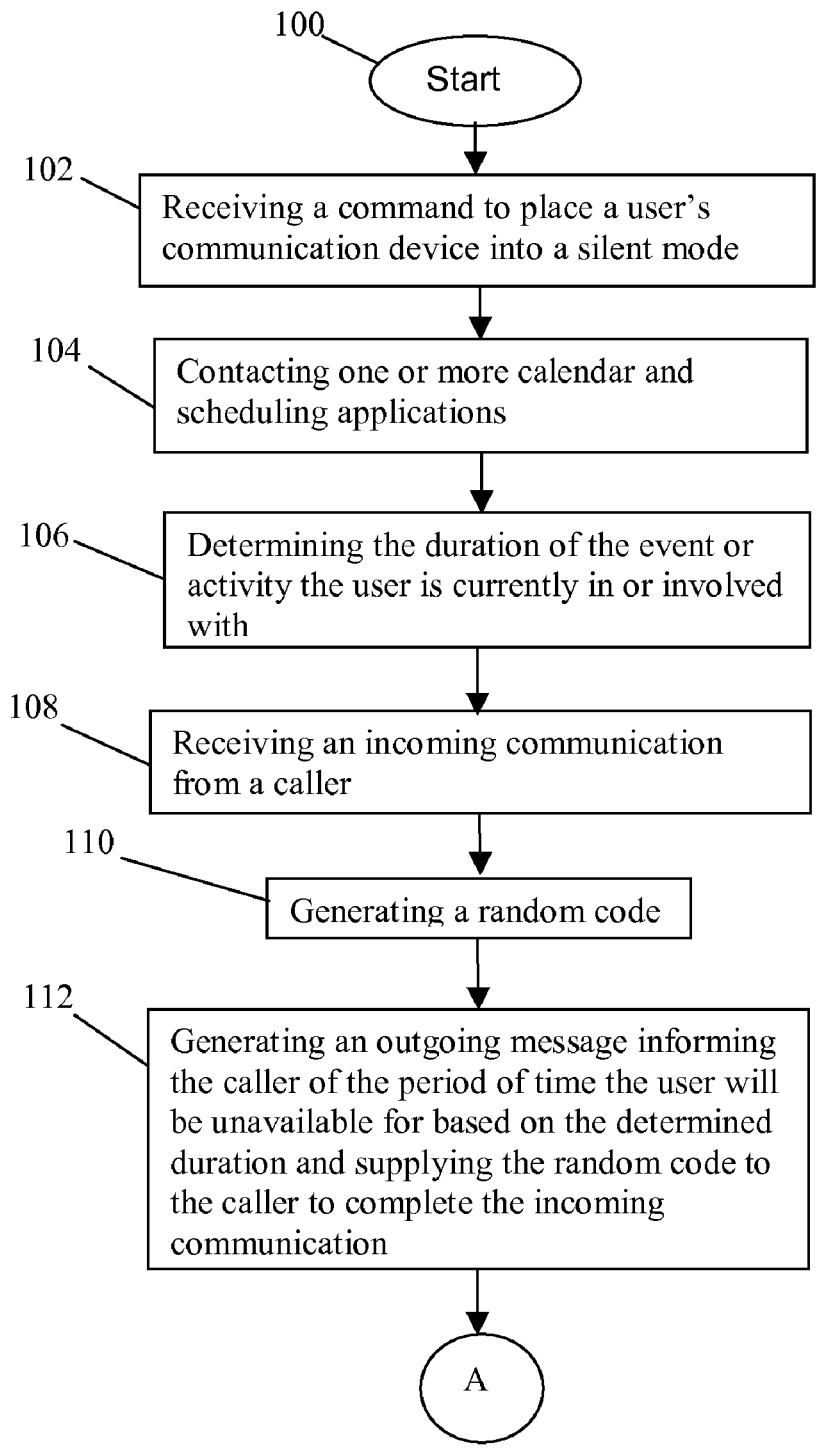
FIGS. 1A and 1B are a flowchart for dynamically permitting the completion of urgent communications to a wireless communication device according to embodiments of the invention.

The detailed description explains the preferred embodiments of the invention, together with advantages and features, by way of example with reference to the drawings.

DETAILED DESCRIPTION

The widespread adoption of mobile communication devices has led to a significant increase in the use of mobile devices for the purpose of both business and personal communication. However, the increased accessibility in communications, offered by mobile communications devices (cell phones, personal digital assistants (PDA), portable computing devices, etc.) often leads to potential activity related disruptions for mobile device users. Mobile device users often wish to respond to an incoming communication (voice or text) at a later time when an activity they are currently involved in has been completed. On occasion the level of urgency of an incoming communication may warrant the interruption of the recipient mobile device user during their activity. However, in most instances where a cell phone user is attending an important event or meeting, and is not accepting cell phone calls, a person with an urgent need to reach the cell phone user will repeatedly keep trying to reach the cell phone user, without knowing the reason the person being called will not answer their cell phone.

Currently, a mobile communication device user who is involved in an activity in which they do not want to be disturbed may activate a profile on their mobile device based on the activity or meeting, so that their mobile device will only accept calls from pre-selected telephone numbers or contacts. However, this solution has drawbacks in that the mobile device user may still receive non-urgent calls from the pre-selected telephone numbers and contacts, and additionally callers who have not been pre-selected may still need to reach the mobile device user with an urgent matter.

In another current approach for mobile device users who do not want to be disturbed, the user may set their device to answer an incoming call automatically with a recorded message. The recorded message notifies the caller that the user is currently in a meeting or otherwise busy and wishes to be interrupted only for urgent or very important telephone calls. The caller is then given the option of interrupting the user, if the call is urgent, or hanging up. The caller will signal that this is an urgent telephone call by entering a code specified in the message using the keypad of their telephone. Once the caller enters the code, the mobile device notifies the user of the call. The user is then connected to the call in a conventional manner. The drawbacks of this solution is that it is static method that does not provide information about why or for how much longer the person being called is busy, In addition, the code used to signal that the call is important does not change dynamically and people may reuse the code when encountering the message situation again.

Embodiments of the invention provide a method and system for dynamically providing availability information of a called individual to a caller, and selectively permitting the completion of urgent communications to the called individual's mobile communication device. Embodiments of the invention provide automated and dynamically generated messages between a caller and the called mobile communication device. The dynamically generated messages provide information to the caller about the availability of the person being called, and enable the caller to potentially complete a call in the event the caller deems their call as having urgent time value.

In embodiments of the invention mobile communication devices provide dynamic and unique information to each individual caller. The dynamic and unique information provided to callers includes the time the called individual will be available to accept a call, and a randomly generated code that the caller may use to complete the call if the caller deems the subject of the call to be urgent enough to interrupt the called individual. In embodiments of the invention, the dynamic and unique information may be generated from entries in a calendar and scheduling program belonging to the called individual. The randomly generated code is uniquely sent to each caller, and may be used by the caller to enable the called mobile communication device to accept the call.

In embodiments of the invention a user's mobile communication device is configured to automatically contact one or more calendar and scheduling applications to retrieve information about a user's calendar events or activities. In response to the information obtained from the calendar and scheduling applications, the user's mobile communication device may be configured to automatically go into silent mode when the user is entering certain scheduled events and activities, such as a meeting or a movie. In additional embodiments, in the event the user manually places the mobile device into silent mode, the mobile device will then automatically contact one or more of the user's calendar and scheduling applications to determine the length of time the user should not be disturbed. In the event the user's mobile communication device is placed into silent mode, an outgoing message that may be voice or text is automatically generated based on the user's current scheduled event or activity. In embodiments of the invention, the outgoing message informs a potential caller that the mobile device user will be unavailable for a defined period of time, and the caller is provided with a randomly generated code that may be based on a random number generator. The code may be utilized by the caller in the event the caller has an urgent matter, and must reach the mobile communication device user during the user's current activity. In the event the caller has an urgent matter, the caller may either immediately enter the code to activate the user's mobile communication device ringer and to exit silent mode to complete the call, or the caller will be instructed to enter the code and leave a message, and the ringer will be activated to notify the mobile device user to check their message, or the caller may be instructed to make a second call to the user's mobile communication device and leave a message with their urgent matter, and the ringer will be activated to notify the mobile device user of the callers urgent message. In all of the instances outlined above, the user's mobile communication validates the caller's entered code, by matching the entered code with the randomly generated code, before the mobile communication device exits silent mode for the particular caller only who has correctly entered the supplied code. The mobile communication device remains in silent mode for all other callers.

Figure 1B:
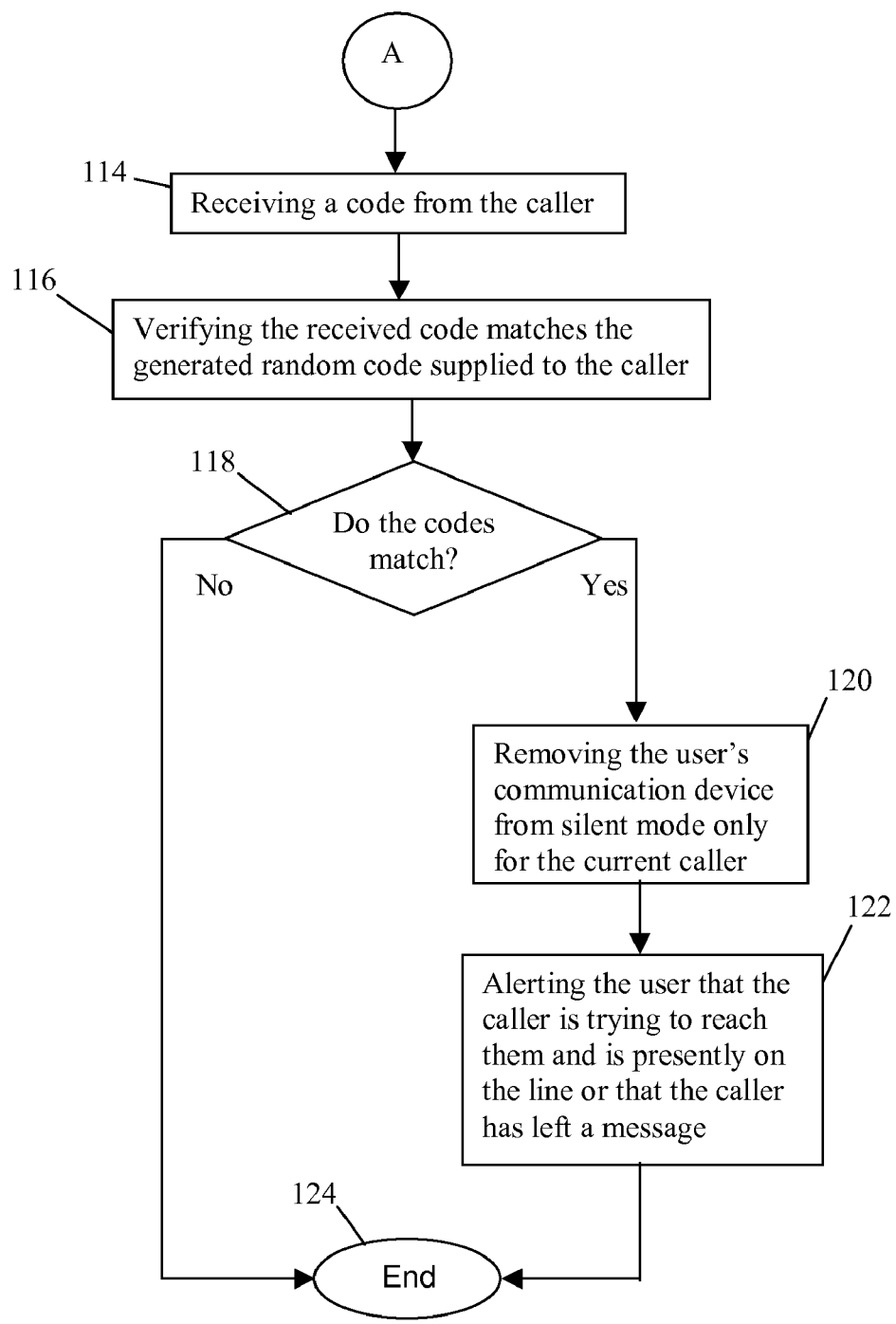

FIGS. 1A and 1B are a flowchart for dynamically permitting the completion of urgent communications to a wireless communication device according to embodiments of the invention. The process starts (block 100) by receiving a command to place a user's communication device into a silent mode (block 102), and contacting one or more calendar and scheduling applications (block 104) to determine the duration of the event or activity the user is currently in or involved with (block 106). Subsequently, the process continues with the reception of an incoming communication from a caller (block 108). In response to the incoming communication, a random code is generated (block 110), and an outgoing message is generated informing the caller of the period of time the user will be unavailable for based on the determined duration, and the random code is supplied to the caller to complete the incoming communication (block 112).

The process continues in FIG. 1B with the receiving of a code from a caller (block 114), and verifying the received code matches the generated random code supplied to the caller (block 116). In the event the caller's supplied code matches the generated random code (decision block 118 is Yes), the silent mode is removed from the user's communication device (block 120) only for the present caller, and the user is alerted that the caller is trying to reach them, and the caller is presently on the line, or that the caller has left a message (block 122), and the process concludes (block 124). In the event the caller's supplied code does not match the generated random code (decision block 118 is No), the silent mode on the user's communication device is not removed, the communication is not completed, and the process concludes (block 124)

Figure 2:
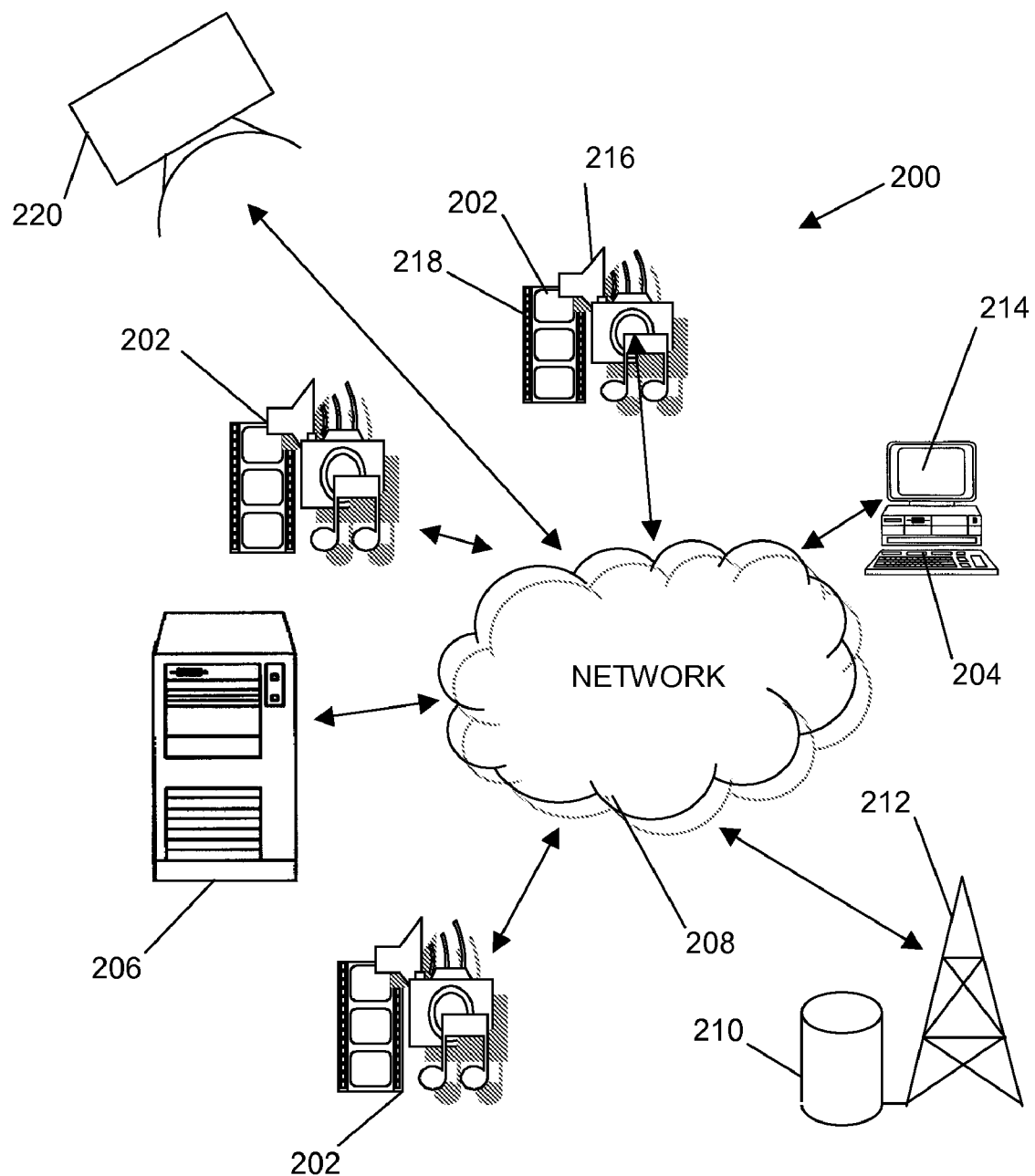
FIG. 2 illustrates a system for implementing embodiments of the invention.

FIG. 2 illustrates an exemplary system 200 configured for dynamically providing availability information of a called individual to a caller, and permitting the completion of urgent communications to the called individual's mobile communication device. The system 200 includes multimedia devices 202, and desktop computer devices 204 configured with display capabilities 214. The multimedia devices 202 may be mobile communication and entertainment devices, such as cellular phones and mobile computing devices that are wirelessly connected to a network 208. The multimedia devices 202 have video displays 218 and audio outputs 216. The multimedia devices 202 and desktop computer devices 204 may be configured with calendar and scheduling software with a graphical user interface (GUI) for implementing embodiments of the invention. The graphical user interface may be configured to provide the user with an ability to define scheduling parameters, and periods of time the user does not want to be disturbed by non-urgent communications. The network 208 may be any type of known network including a fixed wire line network, cable and fiber optics, over the air broadcasts, satellite 220, local area network (LAN), wide area network (WAN), global network (e.g., Internet), intranet, etc. with data/Internet capabilities as represented by server 206. Communication aspects of the network are represented by cellular base station 210 and antenna 212.

The calendar and scheduling software of embodiments of the invention may be resident on the individual multimedia devices 202 and desktop computers 204, or stored within the server 206 or cellular base station 210.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

The invention claimed is:

1. A method for selectively permitting the completion of communications to a user's mobile communication device placed in silent mode comprising:
   receiving, through the user's mobile communication device, an incoming communication from a caller;
   obtaining, through the user's mobile communication device, availability information for the called party and a first code;
   sending, through the user's mobile communication device, a message to the caller with the called party's availability and the first code;
   receiving, through the user's mobile communication device, a call from the caller with a second code; and
   allowing communication with the caller in the event the second code matches the first code; and
   in the event the second code matches the first code, instructing the caller to make a second call to the user's mobile communication device and leave a message with the caller's matter, and alerting the user to check the user's messages.

2. The method of claim 1, wherein the message is a text or voice transmission.

3. The method of claim 1, wherein in the event the second code matches the first code, the method further comprises:
   alerting the user that the caller is trying to reach the user; and
   completing the incoming communication from the caller.

4. The method of claim 1, wherein in the event the second code matches the first code, the method further comprises:
   instructing the caller to leave a voice or text message; and
   alerting the user to check their messages.

5. The method of claim 1, wherein the first code is obtained by generating the code with a random number generator.

6. The method of claim 1, wherein the availability information is obtained from one or more calendar or scheduling applications.

7. An article comprising one or more computer-readable storage media containing computer readable instructions that, when executed by a computer, performs a method for selectively permitting the completion of communications to a user's mobile communication device placed in silent mode comprising:
   receiving, through the user's mobile communication device, an incoming communication from a caller;
   obtaining, through the user's mobile communication device, availability information for the called party and a first code;
   sending, through the user's mobile communication device, a message to the caller with the called party's availability and the first code;
   receiving, through the user's mobile communication device, a call from the caller with a second code; and
   allowing communication with the caller in the event the second code matches the first code; and
   in the event the second code matches the first code, instructing the caller to make a second call to the user's mobile communication device and leave a message with the caller's matter, and alerting the user to check the user's messages.

8. The article of claim 7, wherein the message is a text or voice transmission.

9. The article of claim 7, wherein in the event the second code matches the first code, the method further comprises:
   alerting the user that the caller is trying to reach the user; and
   completing the incoming communication from the caller.

10. The article of claim 7, wherein in the event the second code matches the first code, the method further comprises:
    instructing the caller to leave a voice or text message; and
    alerting the user to check their messages.

11. The article of claim 7, wherein the first code is obtained by generating the code with a random number generator.

12. The article of claim 7, wherein the availability information is obtained from one or more calendar or scheduling applications.

13. A system for mobile communications, the system comprising:
    one or more computing and mobile communication devices in communication through a network;
    wherein the one or more computing and communication devices are configured to:
    receive an incoming communication from a caller;
    obtain availability information for the called party and a first code;
    send a message to the caller with the called party's availability and the first code;
    receive a call from the caller with a second code; and
    allow communication with the caller in the event the second code matches the first code, and in the event the second code matches the first code, instruct the caller to make a second call to the user's mobile communication device and leave a message with the caller's matter, and alerting the user to check the user's messages.

14. The system of claim 13, wherein the message is a text or voice transmission.

15. The system of claim 13, wherein in the event the second code matches the first code:
    the user is alerted that the caller is trying to reach the user; and
    the incoming communication is completed from the caller.

16. The system of claim 13, wherein in the event the second code matches the first code:
    the caller is instructed to leave a voice or text message; and
    the user is alerted to check their messages.

17. The system of claim 13, wherein the first code is obtained by generating the code with a random number generator.

18. The system of claim 13, wherein the availability information is obtained from one or more calendar or scheduling applications.

19. A system for mobile communications, the system comprising:
    one or more computing and mobile communication devices in communication through a network;

wherein the one or more computing and communication devices are configured to:
receive an incoming communication from a caller;
obtain availability information for the called party and a first code;
send a message to the caller with the called party's availability and the first code;
receive a call from the caller with a second code; and
allow communication with the caller in the event the second code matches the first code, wherein a graphical user interface is configured to provide the user with an ability to define a series of scheduling parameters, and periods of time the user does not want to be disturbed by incoming communications.

* * * * *